(12) United States Patent
Dunnihoo et al.

(10) Patent No.: US 6,434,708 B1
(45) Date of Patent: Aug. 13, 2002

(54) PROGRAMMABLE TIMER & METHODS FOR SCHEDULING TIME SLICES EXECUTED BY A CONTROLLER CIRCUIT

(75) Inventors: Jeffrey C. Dunnihoo, Austin, TX (US); Minghua Lin, Campbell, CA (US)

(73) Assignee: Integrated Technology Express, Inc., Sunnyvale, CA (US)

( * ) Notice: Subject to any disclaimer, the term of this patent is extended or adjusted under 35 U.S.C. 154(b) by 0 days.

(21) Appl. No.: 09/289,275

(22) Filed: Apr. 9, 1999

(51) Int. Cl.[7] .................................................. G06F 1/04
(52) U.S. Cl. ........................ 713/502; 713/400; 713/601; 709/400; 710/47; 710/260
(58) Field of Search ................................ 713/400, 500, 713/501, 502, 600, 601; 709/103, 400; 710/25, 47, 48, 49, 58–61, 260–266

(56) References Cited

U.S. PATENT DOCUMENTS

| | | | | |
|---|---|---|---|---|
| 4,736,318 A | * | 4/1988 | Delyani et al. ............. | 364/200 |
| 4,908,750 A | * | 3/1990 | Jablow ........................ | 364/200 |
| 4,972,312 A | * | 11/1990 | Den Boef .................... | 364/200 |
| 5,077,970 A | * | 1/1992 | Hamburg ...................... | 60/274 |
| 5,781,187 A | * | 7/1998 | Gephardt et al. ........... | 710/128 |
| 6,006,247 A | * | 12/1999 | Browning et al. .......... | 709/102 |
| 6,011,798 A | * | 1/2000 | McAlpine ................... | 370/395 |
| 6,108,720 A | * | 8/2000 | Tal et al. ...................... | 710/20 |

* cited by examiner

Primary Examiner—Jeffrey Gaffin
Assistant Examiner—Rijue Mai
(74) Attorney, Agent, or Firm—J. Nichols Gross

(57) ABSTRACT

A programmable timer is disclosed for use in conjunction with a microcontroller circuit. The timer is used as part of a time slice arbiter in a real time operating system, which arbiter manages device routines by allocating them to distinct code time slices executable by such microcontroller. The set up of time slices, including their number, sequence, duration, etc., can be configured and optimized to achieve a desired system performance level based on characteristics of an associated system bus, devices on the bus, etc. The timer operates as a hardware controller to direct the interrupt handler to various entry points in the corresponding routines associated with interrupt based devices on a system bus.

31 Claims, 4 Drawing Sheets

FIG. 2

SLICECTRL | | | Timeslice Control and Status Register
---|---|---|---
Bit | Reset | R/W | Description
7 | 0b | R/W | Enable Timer (1=Run, 0=Stop)
6 | 0b | R/W | Sync to USB SOF (1=When USB SOF is detected from the host, -and- bits 3-0=="0000", the Timeslice timer is cleared, causing an interrupt, if enabled) (0=Normal Operation)
3-0 | 0000b | R/W | Next time slice number scratchpad (0..15) (These bits serve as a protected variable space for the INT0 interrupt routine to keep track of which slice routine should be executed next.)

SLICETIMEH | | | Timeslice Counter Register - HIGH
---|---|---|---
Bit | Reset | R/W | Description
15-8 | | R/W | High byte of counter register. Timer decrements on each MPU instruction clock when SLICECTRL_7==1.

SLICETIMEL | | | Timeslice Counter Register - LOW
---|---|---|---
Bit | Reset | R/W | Description
7-0 | | R/W | Low byte of counter register. Timer decrements on each MPU instruction clock when SLICECTRL_7==1. When this 16 bit register reaches 0000h, an INT0 is generated.

Interrupt Handler

PROGRAMMABLE TIMER & METHODS FOR SCHEDULING TIME SLICES EXECUTED BY A CONTROLLER CIRCUIT

FIELD OF THE INVENTION

The invention relates generally to a circuit and method for implementing a time slice arbiter. The present invention has specific applicability to real time operating systems (RTOS) where microcontrollers are used for managing and controlling a group of peripheral devices located on a high speed bus.

BACKGROUND OF THE INVENTION

Typical contemporary computing systems include a number of data and control busses, including in some cases all or some of the following: (a) a host (processor) bus; (b) a memory access bus; (c) a system bus; (d) an expansion bus, etc. This differentiation is necessary and desirable because various components used with such busses have different performance characteristics; thus, for overall system performance it is generally the case that components of equivalent performance/characteristics are grouped on a single "bus."

One bus architecture that is becoming increasingly popular in use is the Universa Serial Bus (USB). This bus has a number of advantageous characteristics, including the following: (1) ease of use for PC peripheral expansion; (2) low cost implementation for transfer rates up to 12 Mbs; (3) full support for real-time data from voice, audio and compressed video sources; (4) protocol flexibility for mixed mode isochronous data transfers and asynchronous messaging; (5) ease of integration in commodity device technology; (6) applicability to many PC configurations and form factors; (7) reliable standard interface capable of quick diffusion into new products; (8) enables new classes of devices that augment PC capability very easily. As with many bus architectures, the USB also typically includes some form of controller for managing data transfers between peripherals coupled on such bus, as well as between such peripherals and components located on other busses. Such peripherals may include, for example, devices that require real time computing performance, such as network adapters, audio players (audio information), camcorders (video information), etc. While it is obviously critical and advantageous to include such high performance peripherals, it is also extremely difficult for contemporary controllers to manage the demands of such peripherals in an efficient manner. This is because the existence of such real time devices in the operating system means that there are likely to be any number of asynchronous events requiring attention at any moment in time, and this can lead to a number of complex interrupt conflicts that are challenging to resolve using (what are typically) inexpensive hardware/software solutions implemented in microcontroller form. In addition, with fixed or round-robin type priority schemes, the latencies involved cannot be satisfactorily resolved for a real time device.

Accordingly, there is a growing need for a high performance, cost-effective controller solution for managing the demands placed by event intensive bus architectures such as found in the USB and similar RTOS environments.

SUMMARY OF THE INVENTION

An object of the present invention, therefore, is to provide a circuit and method for managing complex electronic components coupled on a high speed, high performance bus; Yet a further object of the present invention is to provide a mechanism for permitting a microcontroller to divide its processing time into distinct time slices, which time slices can be dynamically apportioned as needed to effectuate functions carried out by devices managed by such microcontroller;

Another object of the present invention is to provide an circuit and method for generating time slice interrupts to a microcontroller to permit the latter to utilize a time slice architecture for carrying out processing tasks executed by such microcontroller.

A first aspect of the present invention, therefore, is a programmable timer for coordinating management of interrupt routines in conjunction with an interrupt handler. The handler is associated with a bus controller circuit and executes one or more code routines during one or more respective time slice periods. The timer further comprises: means for storing a first value identifying a time slice period; and means for storing a second value corresponding to a length of the time slice period; and means for generating an interrupt signal to the interrupt handler for causing such handler to execute the one or more code routines. In this manner, the first and second values are provided by the interrupt handler based on timing characteristics of the code routines.

In a preferred embodiment, the bus controller circuit is interfaced to a Universal Serial Bus, and the interrupt handler is executed by a microcontroller. Each of the code routines are firmware routines associated with devices coupled through a bus to the bus controller circuit. The first value for the time slice period is stored in a time slice control and status register, while the second value for the length of the time slice is stored in a time slice counter register. A counter which is operated at a frequency corresponding to the system clock, generates the interrupt signal when a period of time equal to the stored time slice period has expired.

A second aspect of the present invention relates to a method of operating a microcontroller to handle a main routine as well as code routines associated with one or more devices coupled to such microcontroller through a bus such as the USB. The code routines are caused to run during their own respective distinct time slice periods. The method then includes the following steps: (a) interrupting the microcontroller to execute one of such code routines; (b) identifying a time slice to be used by the microcontroller for such code routine; and (c) determining a time length associated with such identified time slice; and (d) executing the code routine during such time length; and (e) returning control to the main routine when such code routine is finished. It can be seen that steps (a) through (e) are repeated as necessary to handle microcontroller operations associated with such devices.

In the preferred method of this aspect of the present invention, an additional step is also executed between steps (a) and (b) of disabling other microcontroller interrupts; a corresponding step between steps (c) and (d) re-enables the other microcontroller interrupts. After step (c), another operation is performed of loading the time length into a counter, which counter generates an interrupt signal when such time length expires. An initial step of associating each of the code routines with one (or more if necessary) of the time slice periods is also performed. An advantage of the present invention is that the identity of the time slice (as well as its length) to be used by the microcontroller for any code routine can be dynamically changed as needed to cope with changing system configurations, operating conditions, etc.

A third aspect of the present invention includes a method for setting up a schedule of time slices associated with a plurality of code routines to be executed by a controller circuit. The method generally includes the steps of: (a) determining a total processor time quantity available to such processing circuit for executing such code routines; (b) determining a total code routine time quantity necessary to execute such code routines; (c) setting up a schedule of time slices, such schedule corresponding to one or more time slice periods to be used by the processing circuit for executing such code routines, such time slice periods corresponding to a time slice number and an associated time slice duration. In this fashion, a sequence of code routines can be executed by the controller circuit during the schedule of time slices. The time slice duration is based on operating characteristics of the device coupled by a bus to the controller circuit, and can be dynamically changed. The code routines are ordered in a time sequence corresponding to a relative handling priority associated with such routines. Again, in preferred embodiment, execution of one of the plurality of such code routines can take place during more than one of such time slice periods, and the particular time slice to be used for any code routine can be dynamically changed.

Although the inventions are described below in a preferred embodiment incorporated within a Universal Serial Bus (USB) environment, it will be apparent to those skilled in the art the present invention would be beneficially used in connection with any microcontroller used for managing real time peripherals on a high speed bus.

DESCRIPTION OF THE DRAWINGS

FIG. 2 is a detailed pictorial depiction of the structure of various configuration registers used in said preferred embodiment;

DETAILED DESCRIPTION OF THE INVENTION

Figure 1:
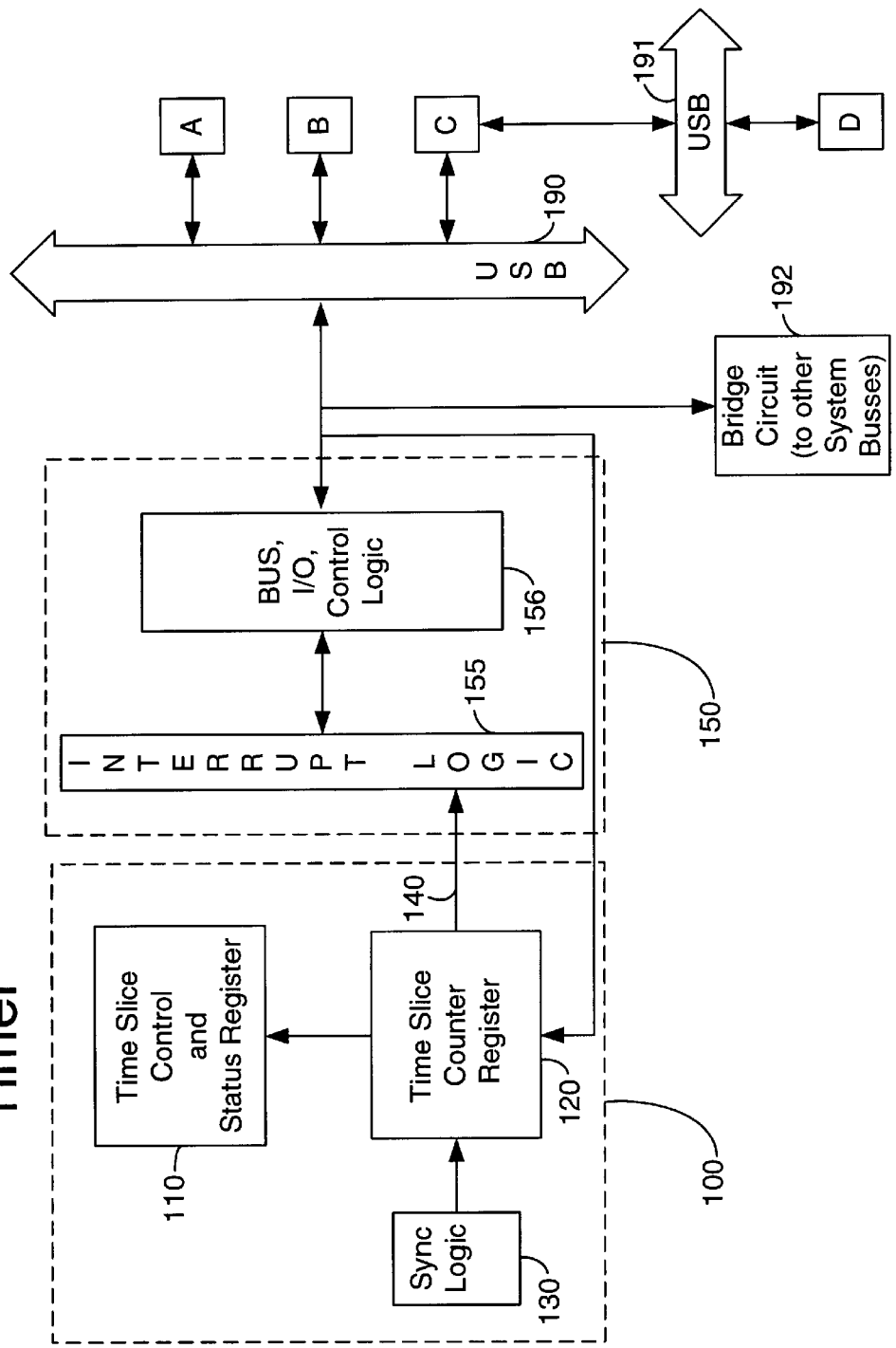
FIG. 1 is a block diagram illustrating the major components of a preferred embodiment of the present invention.

A preferred embodiment of the present invention is illustrated now with reference to the environment depicted in FIG. 1. A programmable timer block 100 includes a Time Slice Control and Status Register 110, Time Slice Counter Register 120, and Synchronization Logic 130. A timer output interrupt signal 140 is generated when Time Slice Counter Register 120 times out at the end of a particular time slice (as explained below) and is used by an input by a microcontroller cirucit 150. In a preferred embodiment microcontroller circuit 150 is an Intel 8031 microcontroller and interrupt signal 140 is used as INT0 input to such device. While the present drawings and discussion depict programmable timer block 100 as being external to such microcontroller circuit 150, it will be apparent to those skilled in the art that such block can be integrated instead as part of such controller if desired.

Microcontroller 150 includes, among other things, Interrupt Logic 155, and Bus I/O and Control Logic 156. In the preferred embodiment, such circuits are comprised of various well-known registers, hardware logic, memory and executable routines associated with the Intel 8031 microcontroller. As noted in FIG. 1, Bus I/O and Control Logic 156 is configured to interact with, as well as read and write to Time Slice Counter Register 120 using conventional techniques.

In general terms, Programmable Timer Block 100 is responsible for generating external interrupt events to Microcontroller 150, and for tracking the time slice number for Interrupt Logic 155. Again, as mentioned above, in a preferred embodiment, Microcontroller 150 is an Intel 8031 device, and those skilled in the art will appreciate that many features of such device which are not germane to the present invention are either simplified or omitted in FIG. 1. Generally speaking, however, microcontroller 150 is typically incorporated within a bus controller, such as a USB controller, to manage bus transactions and activities performed by one or more devices A, B, and C on a bus 190. The details of the remainder of such bus controller circuitry is well-known in the art, and is not included here in order to better demonstrate the details of the present invention. As mentioned above, in a preferred embodiment, bus 190 is a Universal Serial Bus, but the present invention is by no means limited to such applications.

A detailed illustration of the structure of Time Slice Control and Status Register 110 and Time Slice Counter Register 120 is given in FIG. 2. As noted there, the lower four bits (0–3) of SLICE CTRL are used to store the value of the time slice routine that is to be acted upon next by microcontroller Interrupt Logic 155. Bit 6 is generally referred to as a sync status bus. This bit is normally reset to 0 during operation of Programmable Timer 100, but is set when there is no time slice executing, and an output from Sync Logic 130 is triggered high by the detection of an SOF signal from the USB. This event also clears any remaining value in Time Slice Counter (SLICETIME H/L) as noted below. Finally, Bit 7 is a timer enable bit; this bit is reset at the beginning, and set at the end of each time slice cycle by Interrupt Logic 155. In this particular embodiment, Bits 4 and 5 are reserved for additional functionality that may be desired for a particular application.

Figure 3:
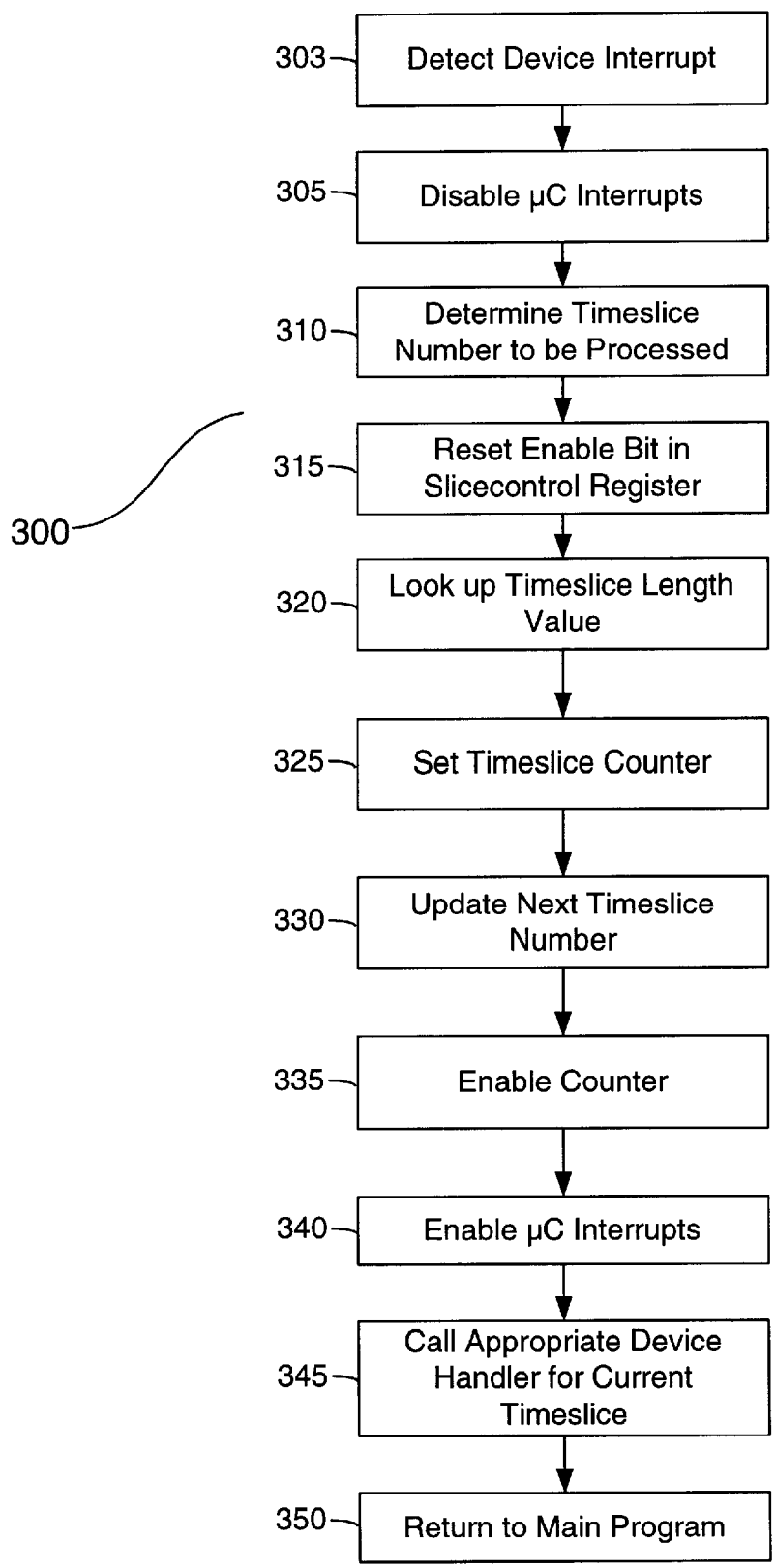
FIG. 3 is a flow diagram of the operation of an interrupt handler used in said preferred embodiment.

The operation of Interrupt Logic 155 is depicted pictorially in FIG. 3. After receiving an interrupt signal 140, an interrupt handler then executes a software routine 300 which performs the following functions:

1. After a device interrupt is detected at step 303, all other less priority interrupts to the Microcontroller are disabled at step 305;
2. The SLICECNTRL Register 110 is then read to determine the current time slice number to be processed at step 310;
3. At the same time, at step 315, enable bit 7 is cleared in SLICECNTRL Register 110;
4. Following this at step 320, the interrupt handler determines the length of the current time slice from a conventional look up table; and
5. The length of the time slice is then set at step 325 in SLICETIMEH and SLICETIMEL;
6. At step 330, the next time slice number to be processed is updated in Register 110;
7. Enable bit 7 is then set at step 335 in SLICECNTRL Register 110 to start SLICETIMEH and SLICETIMEL register 120;
8. At step 340, regular interrupts are re-enabled;
9. The appropriate handler routine for the current time slice is then invoked at step 345;

10. Control is then returned to a main program loop at step 350.

In this manner, it can be seen that normal interrupts are only disabled long enough to set up the next time slice timer. At step 345, the task associated with a particular time slice is now executed by the microcontroller until the current time slice times out. The above is but one illustrative example, of course, and the present invention is certainly not limited to the particular methodology explained immediately above. It is conceivable, for example, that the next time slice number to be processed might be updated in Register 110 by control logic other than Interrupt Logic 155.

Figure 4:
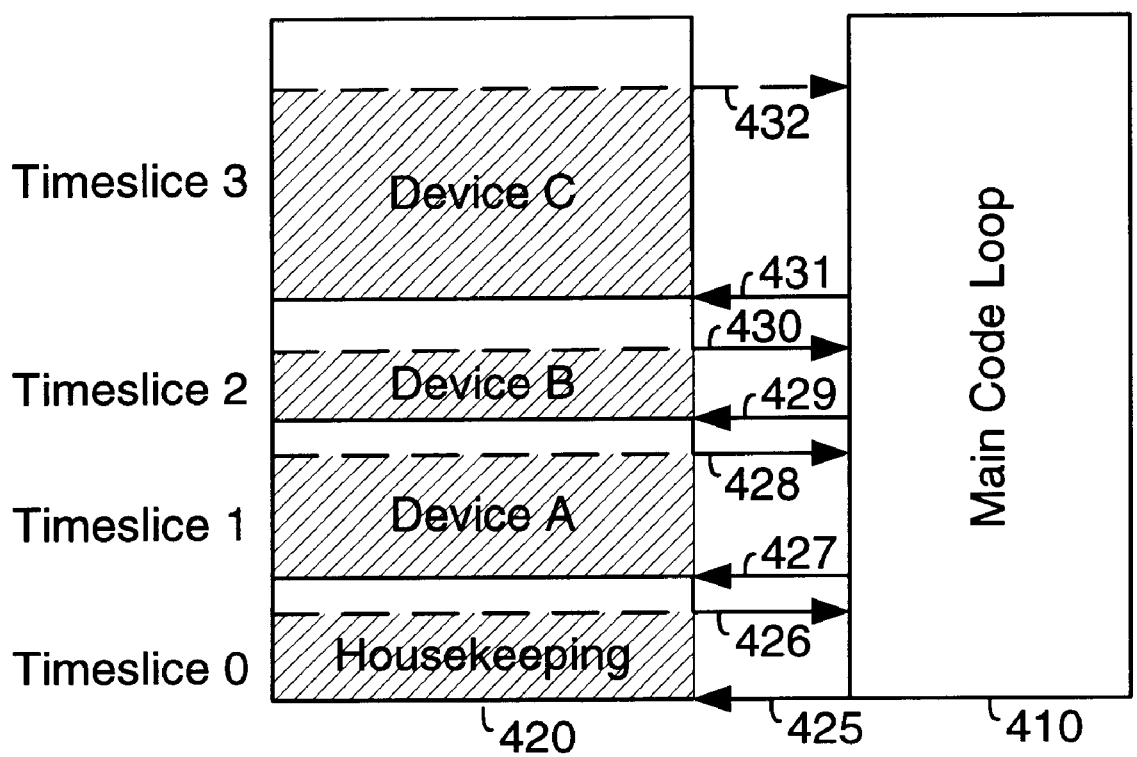
FIG. 4 describes a timing/operational relationship between a main program routine and various device handler routines executed by a microcontroller forming part of said preferred embodiment.

An example of the operation of the present invention is now given with reference to FIG. 4. In this figure, it can be seen that the number, sequence, and length of time slice routines can be configured in accordance with various system parameters. For example, in a system having three devices A, B, and C on system bus 190, a total processing time available to Microcontroller circuit 150 can be subdivided into a set of four time slices by Interrupt Logic 155 to handle the software routines associated with each of such respective devices as well as an associated microcontroller house keeping routine. The sequence of such time slices can also be dynamically adjusted according to the priority to be given to each device. Finally, each respective time slice can be dynamically given a different length to accommodate the timing and latency requirements of such device. In this manner, the present invention can accommodate changes in the system configuration, or other changing operating conditions in the system.

In other words, with reference to the system illustrated in FIG. 1, assume that there are 3 devices that need to be handled at least every other frame on a USB, and that the clock is set on the microcontroller to 1 μs instruction cycles. In the case of the Intel 8031, Interrupt Logic 155 then determines that approximately 2,000 total instruction cycles that can be utilized by three software handlers associated with such devices. The interrupt handler also identifies the total number of instruction cycles that are needed for such devices as well as house keeping tasks.

Assume then that the following are required for a typical application:

Housekeeping—300 instruction cycles

Device A—420 instruction cycles

Device B—200 instruction cycles

Device C—800 instruction cycles

Based on such parameters, Interrupt Logic 155 can set up four time slice frames of the following duration:

SLICE 0=350 instruction cycles

SLICE 1=500 instruction cycles

SLICE 2=250 instruction cycles

SLICE 3=900 instruction cycles

It will be apparent to those skilled in the art that other variations are of course possible to effectuate the needed functionality in any particular environment. Moreover, in some environments it is entirely acceptable to allocate a time slice that is less than that required to complete a task for a particular device. In such instances it is commonly the case that the task is merely suspended, and the context information is saved until the next iteration so that the task may be completed at such time.

Based on such parameters, the operation of Interrupt Logic 155 for a complete code cycle 400 is depicted in FIG. 4, which depicts the two forms of routines executed by microcontroller circuit 150; namely, a main code loop 410, and a series of time slice routines 420. At startup, main code loop 410 sets SLICECTRL Register 110 to 80 (hex) and SLICETIMEHIL Register 120 is set=FFFF (hex). This set up will cause an interrupt to be generated by Programmable Timer 100 the next time a start of frame (SOF) occurs. When this happens, entry to time slice routines 420 occurs at code location 425; the Interrupt Logic handler sees that the current slice to handle is "0000" and immediately loads a time slice length value of 350 into SLICETIMEH/L, and a next time slice identifier value of "0001" into SLICECTRL. Then the handler executes the routine associated with time slice SLICE0; in this case, Housekeeping routines. When complete, the handler returns to the main loop at 426 with about 50 instructions to spare before the next interrupt.

Now, when the 350 count expires in SLICETIMEH/L, another interrupt is generated at 427 to handle routines associated with SLICE1. A time slice length (duration) value of 500 is then loaded into SLICETIMEH/L and a time slice identifier value of "0010" is loaded into SLICECTRL. The handler then executes SLICE1 code, corresponding to the instructions associated with processing for Device A. This returns with about 80 instructions to spare at location 428 before the next interrupt.

At code location 429, after the second 500 count expires, another interrupt is generated to handle a routine designated for time slice SLICE2. As above, a time slice length value of 250 is loaded into SLICETIMEH/L along with a time slice identifier value of "0011" into SLICECTRL. In this instance, for time slice SLICE2, the code associated with Device B is then executed. This routine returns at location at location 430 with about 50 instructions to spare.

When the 250 count expires, another interrupt is generated at entry point 431 to handle SLICE3. At this point, a number greater than 800 (such as 900 for example) is loaded into SLICETIMEH/L and a next time slice identifier value of "0000" into SLICECTRL. As with the other entry points above, the handler then executes SLICE3 code, corresponding to the code for Device C. This routine returns with about 100 instructions to spare at location 432.

It should be noted that if a SOF event does not occur during a particular time slice, SLICETIMEH/L will timeout on its own, and the handler can take whatever measures are required. If it is necessary for a routine to go beyond the time expected for a next occurence of a SOF—for instance, using the above parameters if a routine required more than 1000 instructions—than a 1 ms SOF occurs, forcing SLICETIMEH/L to timeout and synchronizing interrupt signal 140 with the new clock.

Note that the instruction times allocated to routines in any particular environment do not have to be 100% exact for the invention to function properly. The only real constraint is that the instruction times must be guaranteed maximums (taking into consideration polling delays) for the devices in question. This provides a system designer with significant flexibility since the allocation of time slices to devices, as well as their relative priority, can be handled dynamically and changed as necessary to accommodate new system architectures, variations/improvements in code routines, variations/improvements in system clock speeds, variations/improvements in microcontroller performance, variations/improvements in bus speeds, component differences, etc. The set up of time slices 410, including the number, sequence, duration, etc., can be pre-stored in a programmable memory of Microcontroller Circuit 150, or alternatively, can be determined at start-up by Interrupt Logic 155 based on parameters passed on or gleaned from an examination of devices A, B, C, etc., and characteristics of the associated microcontroller/microprocessor executing the interrupt handler routines. In other words, time slices 410 can be configured and optimized to achieve a desired system performance level based on characteristics of such bus, devices on the bus, etc.

In addition, in another variation of the invention, a particular code routine can be associated with more than one time slice period. For example, if 5 time slice periods are set up in a time slice schedule, and only four routines need to be executed, one of such routines can be set up to operate in more than one of such time slice periods 410.

In the event a handler subroutine does not require its entire allotted time slice, that available processing time automatically reverts to main routine 410 or other interrupt routines. If a routine overruns its timeslot, then it is possible, in many systems, to recover by keeping interrupts disabled so that the next time slice will be serviced as a pending interrupt. Furthermore, the resyncronization with start of frame (SOF) may be delayed for several frames if desired. SLICETIMEH/L must run from a clock that is synchronized with the microcontroller/microprocessor clock, but must continue to run independently of any stopclock events, and power management clock stoppages. Finally, SLICETIMEH/L counter also can be stopped by writing 0000 to it after disabling its interrupt.

Some unique aspects of the present invention include:

(a) the aforementioned small timer block 100 allows a microcontroller to manage a large number of asynchronous interrupts in a deterministic manner, much as a larger real time operating system would on a larger scale;

(b) This block is independent of other microcontroller devices and therefore transparent to the handler code. It can also handle a large number of out-of-order timeslice interrupts with various periods;

(c) Instead of multiple asynchronous interrupt events, processor time is divided into various time slices. Main software routine 410 schedules individual tasks into these timeslices, and adjusts their load according to the current conditions of operation;

(d) The timeslice routines are simplified, because they can effectively poll devices at a given rate while other activities are continuing;

(e) Multiple timeslices can be assigned to a single heavy task. For example, Time Slice 0 and Time Slice 3 could be assigned to a single polling routine which allows other tasks to continue while polling.

Although the present invention has been described in terms of a preferred USB embodiment, it will be apparent to those skilled in the art that many alterations and modifications may be made to such embodiments without departing from the teachings of the present invention. For example, while an example is given above for a system including three devices, it is apparent that the present invention would be beneficial used in any high speed bus system having a multitude of components. Other types of hardware logic and firmware variations beyond those illustrated in the foregoing detailed description can be used suitably with the present invention. Accordingly, it is intended that the all such alterations and modifications be included within the scope and spirit of the invention as defined by the following claims.

What is claimed is:

1. A programmable timer for coordinating management of interrupt routines in conjunction with an interrupt handler, which interrupt handler coordinates execution of one or more code routines during one or more respective time slice periods, the timer comprising:

means for storing a first value identifying a time slice period; and means for storing a second value corresponding to a variable length of said time slice period; and means for generating an interrupt signal to the interrupt handler for causing execution of the one or more code routines; and wherein said first and second values are provided by the interrupt handler based on timing characteristics of the one or more code routines.

2. The timer of claim 1, further including a microcontroller, and wherein the interrupt handler is a routine executed by said microcontroller.

3. The timer of claim 1, wherein said code routines are firmware routines associated with devices coupled through a bus to a bus controller circuit.

4. The timer of claim 1, wherein said means for storing said first value includes a first register.

5. The timer of claim 3, wherein said timer is synchronized to a clock used by such bus controller circuit.

6. The timer of claim 1, wherein said means for storing said second value includes a second register.

7. The timer of claim 1, further including a counter which is operated at a frequency corresponding to said clock, and which operates to generate said interrupt signal when a period of time equal to said stored time slice period has expired.

8. The timer of claim 1, wherein said bus controller circuit is interfaced to a USB (Universal Serial Bus).

9. The programmable timer of claim 1, wherein said code routines are real-time executed software routines associated with real-time processing tasks.

10. The programmable timer of claim 1, wherein a plurality of separate time slice frames are set up, including a plurality of time slice periods and associated time slice lengths.

11. The programmable timer of claim 10, wherein at least one code routine of said plurality of code routines uses an execution time that is longer than any of said plurality of associated time slice lengths, such that a plurality of time slices are used for said at least one code routine.

12. A method of operating a microcontroller to handle a main routine as well as real-time code routines associated with one or more real-time computing requirement devices coupled to such microcontroller, the real-time code routines running during respective distinct time slice periods, the method including the steps of:

(a) interrupting the microcontroller to execute one of such real-time code routines for an associated real-time computing requirement device;

(b) specifying a time slice to be used by the microcontroller for such real-time code routine; and (c) specifying a time slice length associated with said identified time slice, said time slice length being programmable and determined in accordance with computing and latency requirements of said associated real-time computing requirement device; and (d) executing the real-time code routine during said time length; and (e) returning control to the main routine when such real-time code routine is finished; and (f) repeating steps (a) through (e) as necessary to handle microcontroller operations associated with others of such real-time computing requirement devices;

wherein a combination of real-time code routines and non-real-time code routines are executable by the microcontroller.

13. The method of claim 12, further including a step between steps (a) and (b): disabling other microcontroller interrupts associated with non-real-time code routines; and a further step between steps (c) and (d): re-enabling said other microcontroller interrupts.

14. The method of claim 13, further including a step after step (c): loading said time slice length into a counter, which counter generates an interrupt signal when said time slice length expires.

15. The method of claim 13, further including a step of associating each of said real-time code routines with at least one of said time slice periods.

16. The method of claim 15, further including a step of associating one of said code routines with more than one of said time slice periods.

17. The method of claim 12, wherein sequencing for a first time slice to be used by the microcontroller for at least a first real-time code routine can be dynamically changed, including in response to a change in priority specified for a first real-time computing requirement device using such first real-time code routine.

18. The method of claim 17, wherein a time slice length associated with said first time slice can also be dynamically changed in accordance with changes in latency and timing requirements of said first real-time computing requirement device.

19. The method of claim 12, further including a step of: ordering execution of said real-time code routines within time slices in accordance with a priority required by each of said real-time computing requirement devices.

20. The method of claim 12, wherein each of the real-time computing requirement devices includes an asynchronous interrupt, and said asynchronous interrupt is serviced by a time slice routine interrupt generated by a programmable timer.

21. A method for setting up a schedule of time slices associated with a plurality of code routines to be executed by a processing circuit, said method comprising the steps of:
(a) determining a total processor time quantity available to such processing circuit for executing such plurality of code routines;
(b) determining a total code routine time quantity necessary to execute such plurality of code routines;
(c) setting up a schedule of time slices, said schedule corresponding to one or more time slice periods to be used by said processing circuit for executing such plurality of code routines, said time slice periods corresponding to a time slice number and an associated time slice duration for each code routine, and which time slice number and associated time slice duration is adjustable based on timing requirements of each of said code routines;
wherein said plurality of code routines can be executed by the controller circuit during said schedule of time slices.

22. The method of claim 21, wherein a first associated time slice duration is based on operating characteristics of a first real-time computing requirement device coupled by a bus to the processing circuit, and said first associated time slice duration can be dynamically changed in accordance with changes in latency and timing requirements of said first real-time computing requirement device.

23. The method of claim 21, wherein said code routines are ordered in a time sequence corresponding to a relative handling priority associated with such routines.

24. The method of claim 21, wherein execution of one of the plurality of said code routines can take place during more than one of said time slice periods.

25. The method of claim 21, wherein a time slice to be used for any code routine can be dynamically changed including in response to a change in priority specified for a real-time computing requirement device using a first real-time code routine executing in said time slice.

26. The method of claim 21, wherein said schedule is determined by dividing up said total processor time into a sequence of time slices.

27. The method of claim 21, wherein said schedule is used by a microcontroller circuit within a bus controller to handle processing requirements of a plurality of real-time devices connected through a bus to said bus controller.

28. A method of executing routines within a processing circuit for a plurality of real-time tasks, the plurality of real-time tasks being associated with a plurality of real-time devices employing a plurality of asynchronous interrupts, the method comprising the steps of:
(a) determining a plurality of completion times required by a plurality of code routines associated with the plurality of real-time tasks;
(b) determining a sequence of execution of said plurality of code routines in accordance with a priority value associated with each of the plurality of real-time tasks;
(c) ordering said plurality of real-time tasks and their respective plurality of code routines to generate an execution schedule of time-slices, each of said time slices having a time-slice period with a variable length set in accordance with a respective completion time determined in step (a);
(d) executing said plurality of code routines for the plurality of real-time tasks in accordance with said execution schedule;
wherein the plurality of asynchronous interrupts are managed by dividing processing time of the processing circuit based on said execution schedule.

29. The method of claim 28, wherein at least one of said plurality of code routines for the plurality of real-time tasks can be allocated more than one non-consecutive time-slice for execution.

30. The method of claim 28, wherein said execution schedule is used by a bus controller circuit.

31. The method of claim 29, further including a step of disabling normal interrupts for the processing circuit during a setup period when a current time-slice number is processed, and a timer for said time-slice number is set.

* * * * *